(12) United States Patent
Miyoshi et al.

(10) Patent No.: US 6,978,874 B2
(45) Date of Patent: Dec. 27, 2005

(54) STARTING CLUTCH

(75) Inventors: Tatsuro Miyoshi, Fukuroi (JP); Yoshio Kinoshita, Shizuoka-ken (JP); Shiro Takeuchi, Shizuoka-ken (JP); Hirofumi Nakagomi, Fukuroi (JP); Tadashi Watanabe, Kakegawa (JP); Hiroshi Yabe, Kakegawa (JP); Nobuhiro Horiuchi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/282,091

(22) Filed: Oct. 29, 2002

(65) Prior Publication Data

US 2003/0085094 A1 May 8, 2003

(30) Foreign Application Priority Data

Nov. 5, 2001 (JP) .............................. 2001-339366

(51) Int. Cl.[7] .............................................. F16D 13/72
(52) U.S. Cl. ................. 192/70.12; 192/113.3; 192/113.34; 192/113.36
(58) Field of Search ...................... 192/70.12, 113.36, 192/113.3, 89.26, 105 F, 113.34

(56) References Cited

U.S. PATENT DOCUMENTS

| 1,479,972 | A | * | 1/1924 | Sturt et al. ............... 192/70.12 |
| 2,178,050 | A | * | 10/1939 | Peterson .................. 192/105 F |
| 2,210,416 | A | * | 8/1940 | Kiep et al. ............... 192/85 AA |
| 4,023,661 | A | * | 5/1977 | Flotow .................... 192/113.34 |
| 4,280,608 | A | * | 7/1981 | LaBuda et al. .......... 192/113.3 |
| 4,436,193 | A | * | 3/1984 | Smirl ...................... 192/113.36 |
| 4,473,144 | A | * | 9/1984 | Allori ....................... 192/70.12 |
| 4,488,626 | A | * | 12/1984 | Handke .................... 192/70.12 |
| 4,560,056 | A | * | 12/1985 | Stockton ................. 192/113.32 |
| 4,699,259 | A | * | 10/1987 | McColl .................... 192/70.12 |
| 4,724,942 | A | * | 2/1988 | Casse et al. ............. 192/70.12 |
| 4,856,635 | A | * | 8/1989 | Vlamakis ................. 192/70.12 |
| 4,997,074 | A | * | 3/1991 | Larson et al. .......... 192/113.34 |
| 5,101,953 | A | * | 4/1992 | Payvar .................... 192/113.36 |
| 5,626,215 | A | * | 5/1997 | Berger et al. ............ 192/70.12 |
| 5,655,368 | A | | 8/1997 | Koike et al. .................. 60/338 |
| 5,755,314 | A | * | 5/1998 | Kanda et al. ............ 192/70.12 |
| 6,332,521 | B1 | * | 12/2001 | Shoji ...................... 192/55.61 |

FOREIGN PATENT DOCUMENTS

JP          3-239818 A   * 10/1991

* cited by examiner

Primary Examiner—Rodney H. Bonck
(74) Attorney, Agent, or Firm—Miles & Stockbridge P.C.

(57) ABSTRACT

In the starting clutch, an electrical pump or an engine pump is omitted and a substitutive pump mechanism is obtained with a simple construction thereby to circulate lubricating oil within the starting clutch. There is provided a starting clutch in which lubricating oil supplied form a drive shaft side is circulated within the clutch and input side elements and output side elements are tightened by an axial load to transmit a power and wherein a non-electrically operated pump mechanism is provided within the starting clutch.

6 Claims, 12 Drawing Sheets

STARTING CLUTCH

BACKGROUND OF THE INVENTION

1. Field of the Invention

The present invention relates to a starting clutch mainly used in an automatic transmission of a vehicle and the like.

2. Related Background Art

FIG. 25 is an axial sectional view of a conventional starting clutch, showing an example of a conventional arrangement. A starting clutch 201 includes a wet type multi-plate clutch 203 and a damper 204 which are disposed within a case 210. In the wet type multi-plate clutch 203, friction plates 290 spline-fitted onto an outer periphery of a hub 280 and separator plates 300 spline-fitted into an inner periphery of a clutch case 310 are alternately arranged and dislodgment of these plates is prevented by a snap ring 212 disposed at an open end of the clutch case 310.

On the other hand, a piston 230 for applying a load to the friction plates 290 and the separator plates 300 is also disposed at the open end of the clutch case 310. The piston 230 is operated by supplying hydraulic oil into an oil chamber 250 defined between the piston and an inner wall of the clutch case 310, and the hydraulic oil is supplied through oil passages 271, 272 provided in members disposed at the inner peripheral side of the wet type multi-plate clutch 203 and oil passages 241, 243 provided in a drive shaft 240. Lubrication of the starting clutch is effected by an electrical pump or an engine pump mainly used for operating the piston.

While the operation of the piston of the wet type multi-plate clutch of the starting clutch has been effected by the hydraulic oil as mentioned above, in recent years, use of an electric motor or an electrically operated equipment such as a ball screw has been investigated in order to enhance accuracy of control of the operation of the piston. On the other hand, since it is not required that the hydraulic oil for operating the piston be supplied, it is considered that the electrical pump or the engine pump can be omitted, but, alternatively, it is required that means for supplying lubricating oil to the wet type multi-plate clutch be reserved.

SUMMARY OF THE INVENTION

Therefore, an object of the present invention is to eliminate an electric pump or an engine pump for operating a piston of a wet type multi-plate clutch and for supplying lubricating oil and to constitute a substitutive pump mechanism with a simple construction and to circulate the lubricating oil within a starting clutch.

To achieve the above object according to the present invention, there is provided a starting clutch in which lubricating oil supplied from a drive shaft side is circulated within the clutch and input side elements and output side elements are tightened or engaged by an axial load to transmit a power and wherein a non-electrically operated pump mechanism is provided within the starting clutch.

More specifically, the non-electrically operated pump mechanism is achieved by grooves or ports or vanes provided in or on at least one of rotary members constituting the starting clutch.

Although the pump mechanism can be achieved by the grooves, ports or vanes provided in or on at least one of the members constituting the starting clutch as mentioned above, in a preferred embodiment of the present invention, the grooves are formed in a drive shaft, a piston, a pawl member of a damper, a clutch case, friction plates and separator plates, and the ports are formed in a base member and the vanes are formed on the base member, a hub and a case. Many grooves, ports of vanes are provided in various areas in order to enhance a circulating ability. The grooves, ports or vanes are formed in spiral or helical forms or have inclination angles with respect to a radial, axial or circumferential direction. Further, the inclination angles, number and arranging sites of the grooves or the vanes can be appropriately selected in accordance with a concrete configuration of the starting clutch and/or required pump capacity. Further, selection of grooves, ports or vanes can be appropriately determined.

Further, the groves, ports or vanes having the pumping function can be obtaining by machining members constituting the starting clutch or by forming them integrally with such members. Alternatively, the grooves, ports or vanes may be formed in other members than the rotary members constituting the starting clutch and may be mounted to the rotary members. In a preferred embodiment, the former includes grooves formed in outer periphery of a drive shaft, ports formed in a base member, grooves formed in a piston, grooves formed in a pawl member of a damper, grooves formed in a clutch case, groves formed in friction plates and grooves formed in separator plates, and the latter includes grooves formed in inner periphery of the drive shaft, vanes formed on inner periphery of, the base member, vanes formed on a hub and vanes formed on the case.

DETAILED DESCRIPTION OF THE PREFERRED EMBODIMENTS

Figure 1:
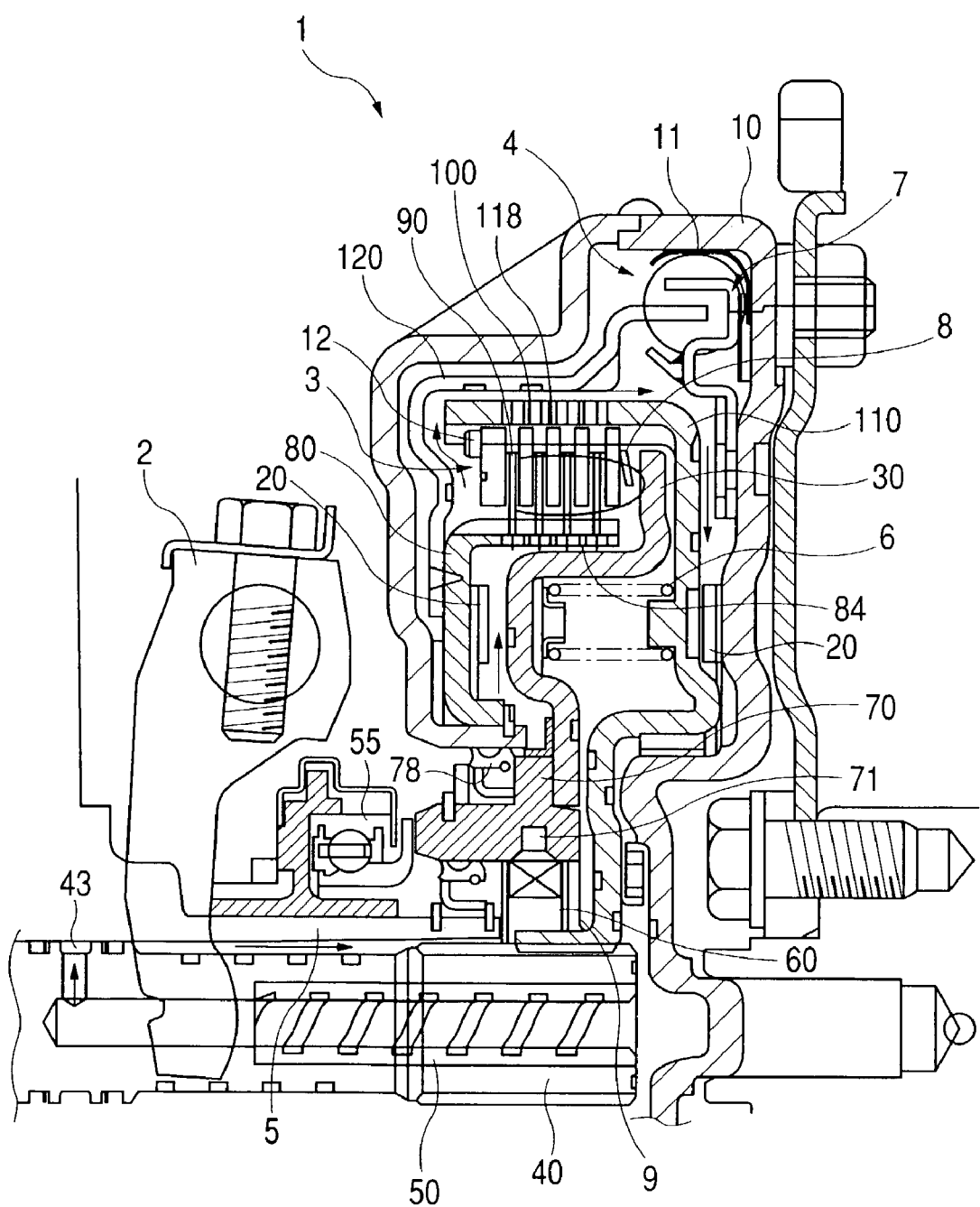
FIG. 1 is an axial sectional view of a starting clutch according to an embodiment of the present invention.

The present invention will now be explained in connection with embodiments thereof with reference to the accompanying drawings. Incidentally, in the drawings, the same elements are designated by the same reference numerals. It should be noted that the embodiments that will be described hereinbelow are merely examples of the present invention and so not limit the present invention.

FIG. 1 is an axial sectional view showing an entire construction of a starting clutch according to an embodiment of the present invention. The starting clutch 1 includes a wet type multi-plate clutch 3 and a damper 4 which are disposed within a case 10. In the wet type multi-plate clutch 3, friction plates (friction engagement elements) 90 are spline-fitted onto a hub 80 and separator plates (friction engagement elements) 100 are spline-fitted into a clutch case 110 which is disposed coaxially with the hub, and dislodgment of these plates is prevented by a snap ring 12 disposed at an open end of the clutch case 110.

A piston 30 is disposed at the open end of the clutch case 110, and a loading spring 6 for applying an engaging load (tightening load) is disposed at an inner diameter side of the piston 30. Further, a leaf spring 8 is disposed between the piston 30 and the separator plate 100 nearest to the piston to absorb or prevent shock during the engagement. Further, when a lever 2 is rotated in an anti-clockwise direction (FIG. 1) by an operation of a ball screw (not shown) to urge a release bearing 55 and a base member 70 to the right in FIG. 1, the piston 30 secured to the base member 70 is shifted to the right in opposition to the urging load of the loading spring 6, thereby releasing the engagement load for the friction engagement elements. On the other hand, when the lever 2 is rotated in a clockwise direction (FIG. 1) by the operation of the ball screw, the piston 30 is shifted to the left in FIG. 1 by the urging load of the loading spring 6, thereby applying the engagement load to the friction engagement elements. In this case, the base member 70 and the release bearing 55 are returned to the left in FIG. 1 by the loading spring 6.

The damper 4 is constituted by a retainer plate 7 secured to an inner wall of the case 10, a damper spring 11 held by the retainer plate 7, and a pawl member 120 secured to a side surface of the hub 80 and engaged by the damper spring 11. With this arrangement, torque inputted from an engine is transmitted to the hub 80 through the case 10, and vibration is absorbed by receiving the pawl member 120 secured to the hub 80 by means of the damper spring 11. Incidentally, the torque is transmitted from the hub 80 to the clutch case 110 through the friction engagement elements and then is outputted to a crank shaft 40 spline-connected to an inner periphery of the clutch case 110.

Supplying of lubricating oil to the friction engagement elements (friction plates 90 and separator plates 100) is effected by supplying lubricating oil from a tank (not shown) to a space between the hub 80 and the piston 30 through a gap between the crank shaft 40 and a fixed shaft 5, a cavity 9 and an oil port 71 provided in a second vane wheel 60 and the base member 70 (i.e., effected through the oil port 71 from the inner diameter side of the hub 80). Thereafter, the lubricating oil is discharged toward an outer peripheral side through an oil port 118 of the clutch case 110 and reaches an inner diameter side of the drive shaft 40 through a space between the clutch case 110 and the case 10 and then is returned to the tank. Incidentally, flow of the lubricating oil is shown by the arrows in FIG. 1.

Figure 2:
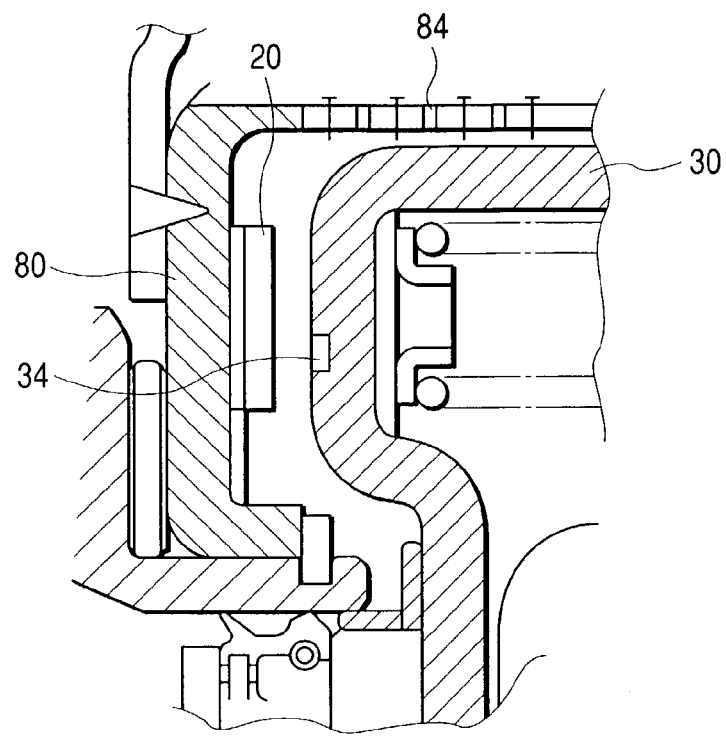
FIG. 2 is an axial enlarged view showing main parts of the starting clutch of FIG. 1.

FIG. 2 is an enlarged view showing main parts of the starting clutch, illustrating the inner diameter side of the hub 80 in an enlarged scale. The circulation of the lubricating oil is effected by rotations of a first vane wheel 20 provided at the inner diameter side portion of the hub 80 and grooves 34 provided in the inner diameter portion of the piston 30. Further, the lubricating oil is supplied to the friction engagement elements through an oil port 84 provided in the hub 80.

Figure 3:
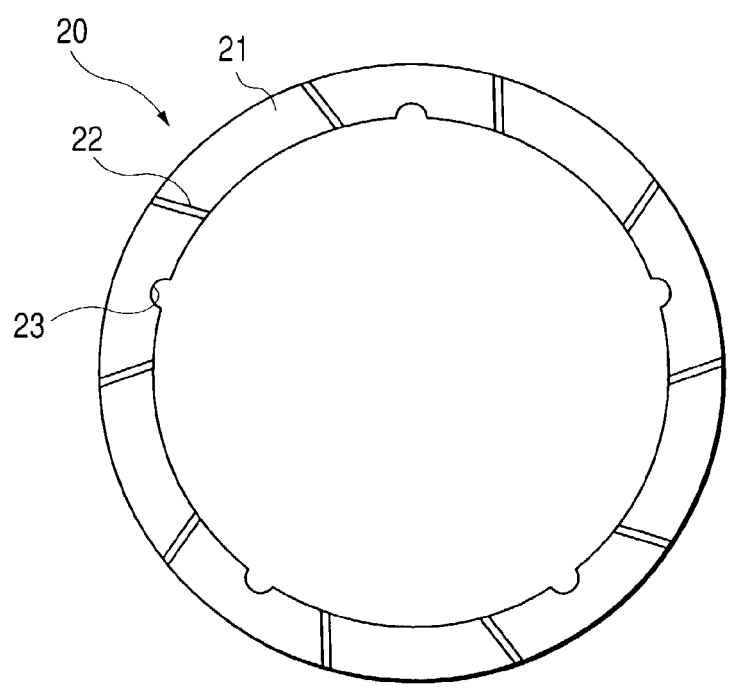
FIG. 3 is a front view of a first vane wheel according to an embodiment of the present invention.
Figure 4:
FIG. 4 is an axial sectional view of the first vane wheel according to the embodiment.

FIG. 3 is a front view of the first vane wheel 20 and FIG. 4 is an axial sectional view of the first vane wheel 20. The first vane wheel 20 is made of synthetic resin and can be formed by injection molding and the like. The first vane wheel 20 is constituted by integrally arranging vanes 22 on an annular plate portion 21. Each vane 22 is inclined in a radial direction so that, when the first vane wheel 20 is rotated in a clockwise direction in FIG. 3, the lubricating oil flows from an inner peripheral side to an outer peripheral side. Incidentally, the annular plate portion 21 is provided with substantially semi-circular notches 23, and the annular plate portion is secured to a recipient member by fitting the notches onto the recipient member and by effecting caulking. Incidentally, as shown in FIG. 1, two first vane wheels 20 are provided within the hub 80 and within the case 10.

Figure 5:
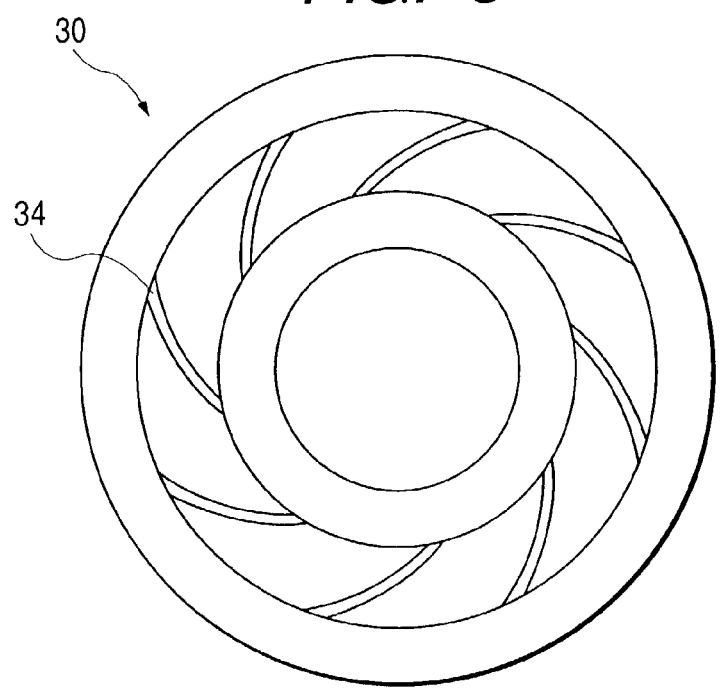
FIG. 5 is a front view of a piston according to an embodiment of the present invention.
Figure 6:
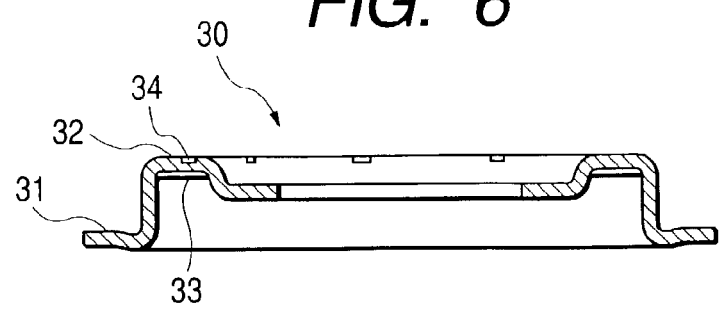
FIG. 6 is an axial sectional view of the piston according to the embodiment.

FIG. 5 is a front view of the piston 30 and FIG. 6 is an axial sectional view of the piston 30. Spiral grooves 34 are formed in an inner peripheral side of an urging surface 31 of the piston 30 and in an opposite surface 32 opposite to an arrangement portion 33 against which the loading spring 6 abuts. Each groove 34 has a predetermined inclination angle with respect to the radial direction so that, when the piston 30 is rotated in an anti-clockwise direction in FIG. 5, the lubricating oil flows from the inner peripheral side to the outer peripheral side.

Figure 7:
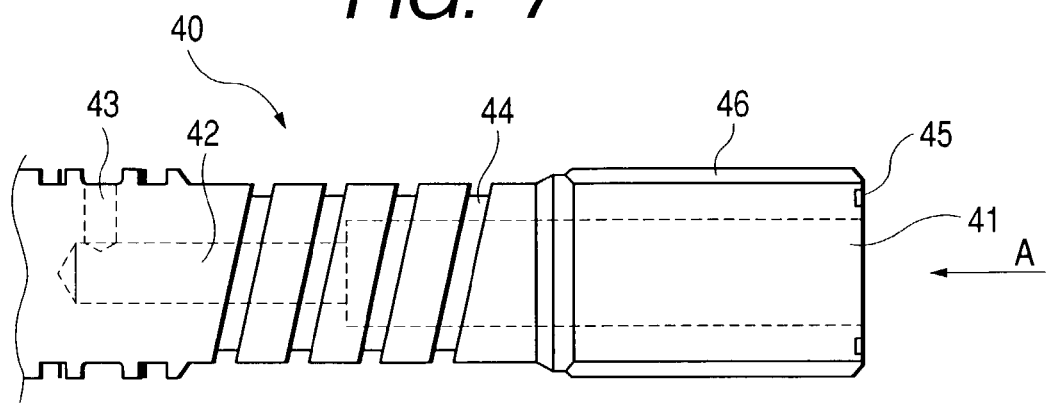
FIG. 7 is a front view of the drive shaft according to an embodiment of the present invention.
Figure 8:
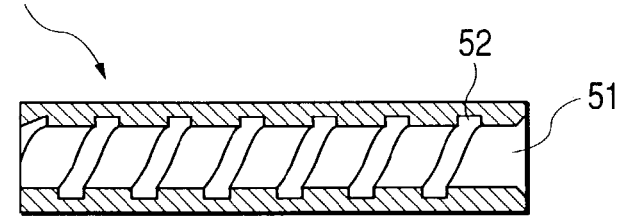
FIG. 8 is an axial sectional view of a cylindrical member according to an embodiment of the present invention.
Figure 9:
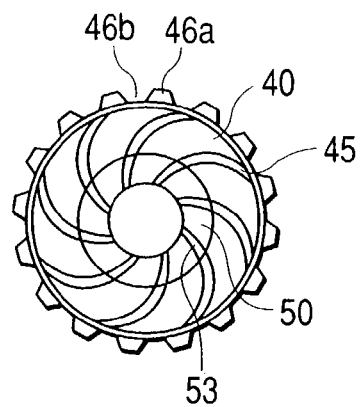
FIG. 9 is a side view of the drive shaft, looked at from a direction shown by the arrow A in FIG. 7.

FIGS. 7 to 9 show the drive shaft 40 shown in FIG. 1. FIG. 7 is a front view of the drive shaft 40, FIG. 8 is an axial sectional view of a cylindrical member 50, and FIG. 9 is a side view of the drive shaft 40, looked at from a direction shown by the arrow in FIG. 7. The drive shaft 40 is provided at its outer peripheral surface with splines 46 which can be fitted in the clutch case 110, and a spiral or helical groove 44 having a predetermined angle with respect to an axial direction. Due to the presence of the groove 44, when the drive shaft 40 is rotated in a clockwise direction looked at from the direction A, the lubricating oil existing at the outer peripheral side flows to the right in FIG. 7.

On the other hand, as shown by the broken line in FIG. 7, the drive shaft 40 is provided at its interior with an axially extending cavity 41 and an oil port 42 extending axially from the cavity 41 and having a diameter smaller than that of the cavity 41. Further, there is provided an oil port 43 extending radially from a closed end portion of the oil port 42 and passing through a wall of the drive shaft. As apparent from FIG. 7, the cavity 41, oil port 42 and oil port 43 are communicated with each other.

The cylindrical member 50 shown in FIG. 8 is press-fitted into the cavity 41 from the direction A in FIG. 7. The cylindrical member 50 is provided at its interior with an oil port 51 and a helical groove 52 inclined at a predetermined angle with respect to the axial direction is formed in an inner wall of the oil port 51. Due to the presence of the groove 52, when the drive shaft 40 is rotated in the clockwise direction looked at from the direction A, the lubricating oil existing in the oil port 51 flows to the left in FIG. 7 and is then discharged out of the drive shaft 40 through the oil ports 42, 43 and is returned to the tank (not shown).

As can be seen from the side view of the drive shaft 40 shown in FIG. 9, grooves 45 each having a pumping function are provided in a side surface of the drive shaft 40. Similarly, grooves 53 are formed in a side surface of the cylindrical member 50. The grooves 45 and the grooves 53 are radially extending grooves each having a predetermined angle with respect to the radial direction, and the grooves 45 are aligned with the grooves 53 to be continuously interconnected. That is to say, the groove 45 is communicated with the corresponding groove 53 to form an integral groove at a glance. In this case, when the oil port 43 is inclined with respect to the radial direction, the oil port can have a pumping function, and, in the illustrated embodiment, orientation of the inclination angle of the oil port is opposite to those of the grooves 45, 53 shown in FIG. 9.

As shown in FIG. 9, a spline 46 comprised of mountain portions 46a and valley portions 46b is formed on the outer peripheral surface of the drive shaft 40 to be spline-connected to the clutch case 110.

Figure 10:
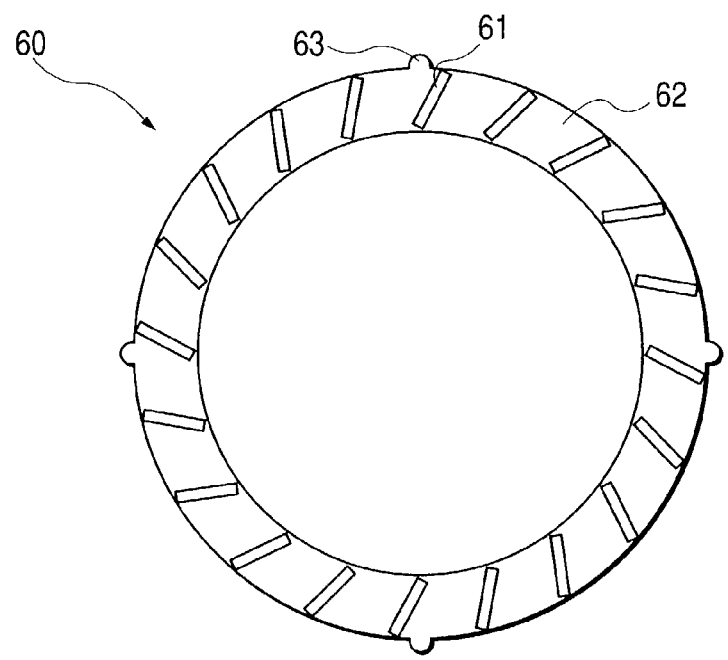
FIG. 10 is a sectional view of a second vane wheel, taken along the line 10—10 in FIG. 11.
Figure 11:
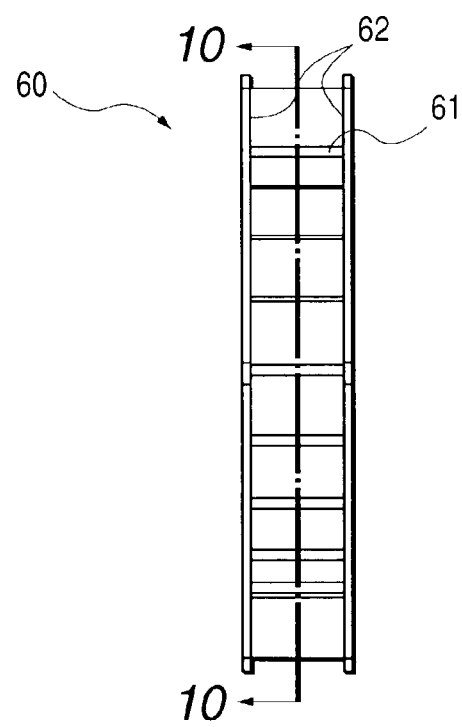
FIG. 11 is a side view of the second vane wheel according to an embodiment of the present invention.

FIGS. 10 and 11 show the second vane wheel 60 in detail. FIG. 10 is a sectional view taken along the line 10—10 in FIG. 11, and FIG. 11 is a side view of the second vane wheel 60. The second vane wheel 60 has two annular side plates 62 between which vanes 61 are disposed in a condition that they are inclined with respect to the radial direction. When the vane wheel 60 is rotated in an anti-clockwise direction in FIG. 10, the lubricating oil flows toward an outer diameter direction. Further, small projections 63 are formed on outer peripheral edges of the annular side plates 62 so that the vane wheel can be attached to the base member 70 (described later) by means of such small projections.

Figure 12:
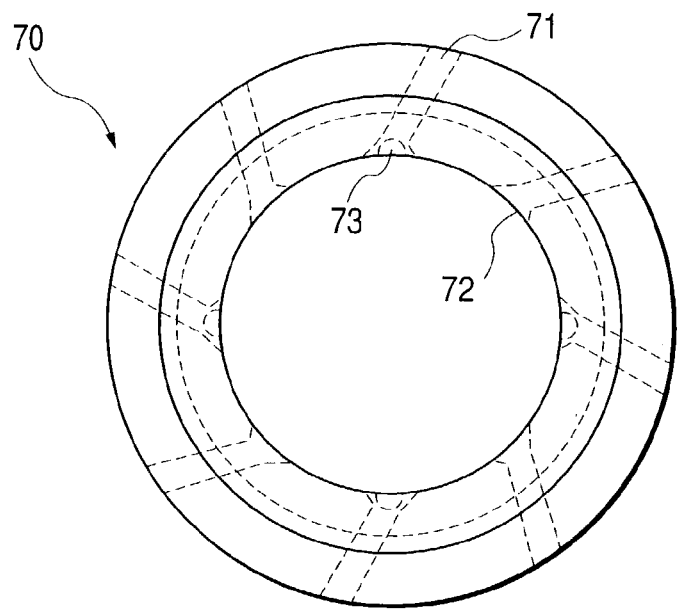
FIG. 12 is a front view of a base member according to an embodiment of the present invention.
Figure 13:
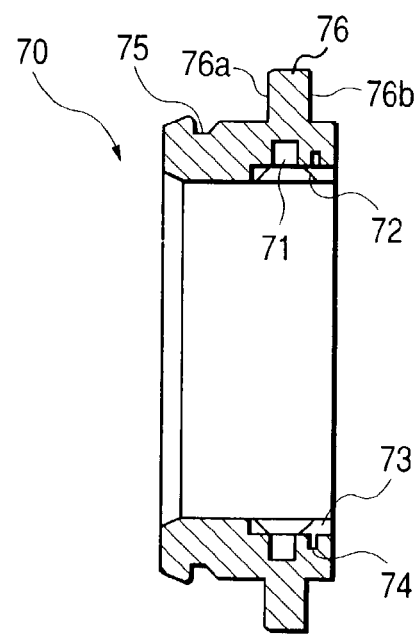
FIG. 13 is an axial sectional view of the base member according to the embodiment.

FIGS. 12 and 13 show the base member 70 in detail. FIG. 12 is a front view of the base member 70 and FIG. 13 is an axial sectional view of the base member. The base member 70 is provided at its outer periphery with an annular recess 75 and an annular extension 76. The base member 70 is secured or fixed by arranging a seal member 78 (refer to FIG. 1) on a left (in FIG. 13) side surface 76a of the extension 76 and fitting a snap ring into the recess 75. On the other hand, the piston 30 is secured to a right (in FIG. 13) side surface 76b of the extension 76 welding.

Further, the base member 70 has oil ports 71 passing through the base member from its inner periphery to its outer periphery, and opening portions 72 wider than the oil ports 71 are formed in the inner peripheral side. Each oil port 71 has a predetermined inclination angle with respect to the radial direction as shown by the broken line in FIG. 12. When the base member 70 is rotated in an anti-clockwise direction in FIG. 12, the lubricating oil flows from the inner peripheral side to the outer peripheral side. Incidentally, the second vane wheel 60 is fixed or secured by fitting the vane wheel into an annular recessed groove 73 formed in the inner peripheral surface of the base member 70 and by attaching a snap ring into an annular groove 74.

Figure 14:
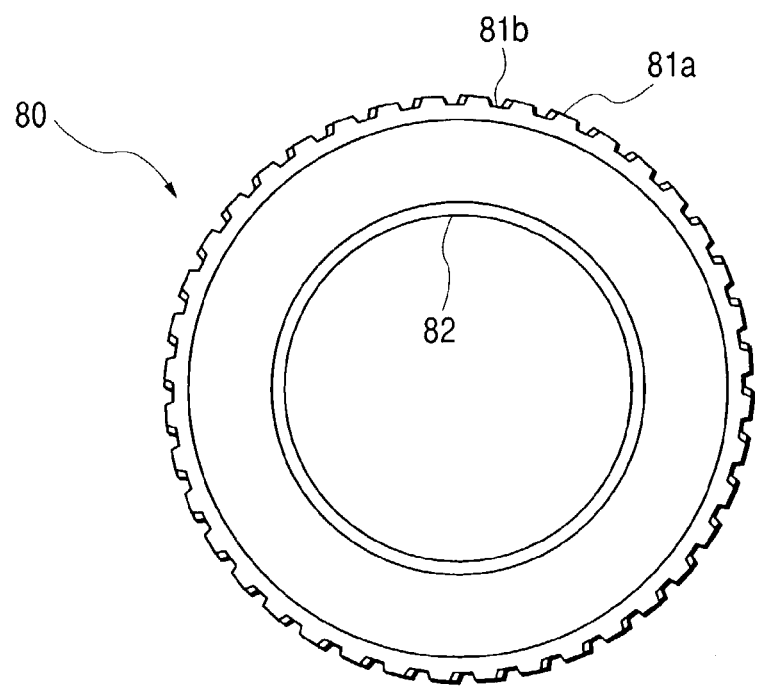
FIG. 14 is a front view of a hub according to an embodiment of the present invention.
Figure 15:
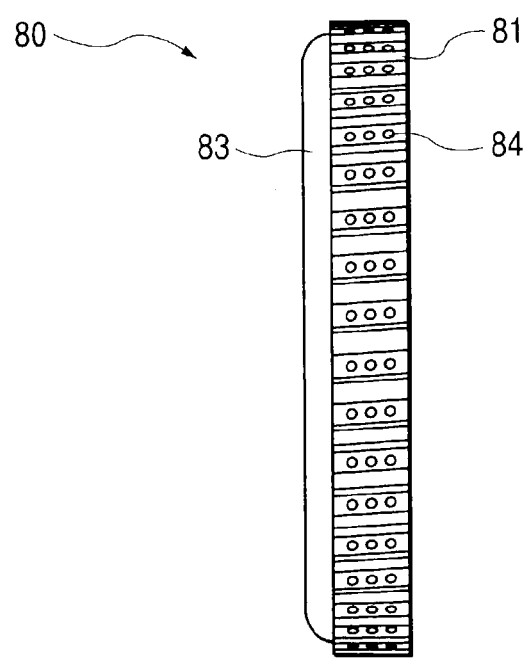
FIG. 15 is a side view of the hub according to the embodiment.

FIGS. 14 and 15 show the hub 80 in detail. FIG. 14 is a front view of the hub 80 and FIG. 15 is a side view of the hub 80. A spline is formed on an outer peripheral flange 81 of the hub 80. The spline is constituted by mountain portions 81a and valley portions 81b. A plurality of oil ports 84 (shown in FIG. 2 as section) are formed in the valley portions 81b of the spline along the spline. The spline has a predetermined inclination angle with respect to the axial direction so that, when the hub 80 is rotated in a clockwise direction in FIG. 14, the lubricating oil is apt to be flown to the right in FIG. 1 or FIG. 15.

However, since the inclination angle is selected to be so smaller that the inclination angle does not affect a bad influence upon the operation of the friction plates 90 and the separator plates 100, such inclination angle gives an effect mainly at a low speed rotation area. Although not shown, each oil port 84 also has a predetermined inclination angle with respect to the radial direction so that, when the hub is rotated in a clockwise direction in FIG. 14, the lubricating oil flows from the inner peripheral side to the outer peripheral side. Incidentally, the inclination is angled leftwardly from the inner peripheral side to the outer peripheral side. Further, an inner peripheral surface 82 of the hub is attached to an inner diameter side flange of the case 10 and is secured by a snap ring. Further, the pawl member 120 which will be described later is secured to a rear surface 83 of the hub 80 by welding.

Figure 16:
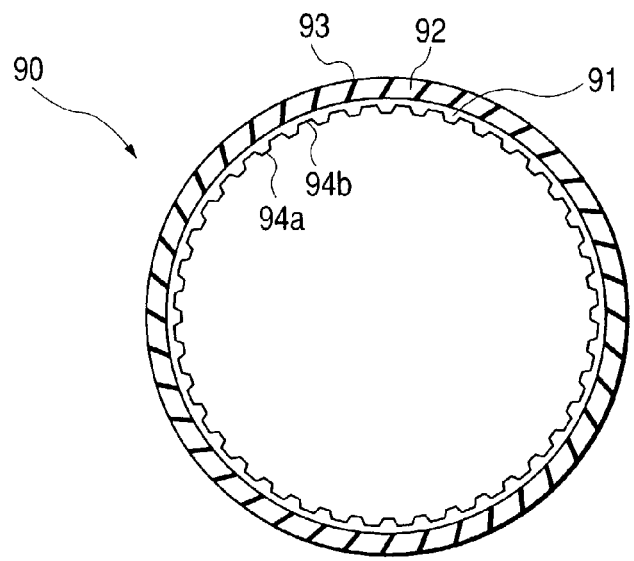
FIG. 16 is a front view of a friction plate according to an embodiment of the present invention.
Figure 17:
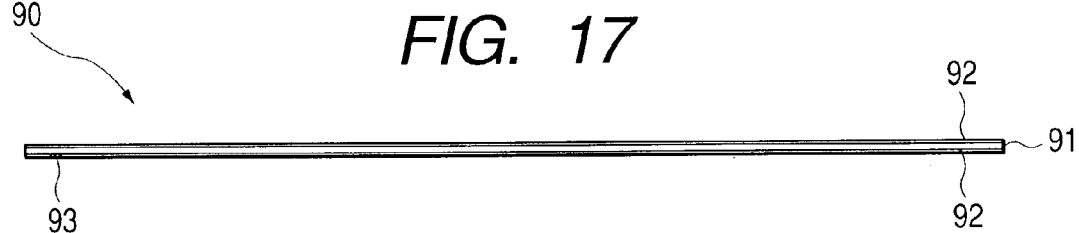
FIG. 17 is an axial sectional view of the friction plate according to the embodiment.

FIGS. 16 and 17 show the friction plate 90 used in the embodiment of the present invention in detail. FIG. 16 is a front view of the friction plate 90 and FIG. 17 is an axial sectional view of the friction plate. The friction plate 90 is constituted by adhering a friction material 92 on an annular core plate 91 having a spline at its inner peripheral edge. The spline includes mountain portions 94a and valley portions 94b. Grooves 93 each an inclination angle with respect to the radial direction are formed in the friction material 92.

When the friction plate 90 is rotated in an anti-clockwise direction in FIG. 16, the lubricating oil flows from the inner diameter side to the outer diameter side. By supplying the lubricating oil to the friction materials 92, the friction plates and the separator plates (described later) are cooled. Incidentally, the grooves 93 can be obtained by urging or cutting the friction material or can be obtained by adhering a plurality of friction material segments with a predetermined gap therebetween. According to the grooves formed by the combination of the segments, since the depth of the groove can be increased, the greater pumping action can be achieved.

Figure 18:
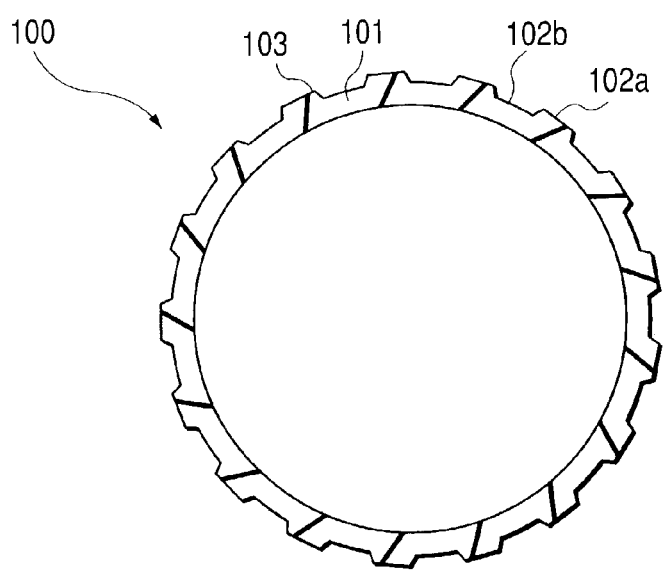
FIG. 18 is a front view of a separator plate according to an embodiment of the present invention.
Figure 19:
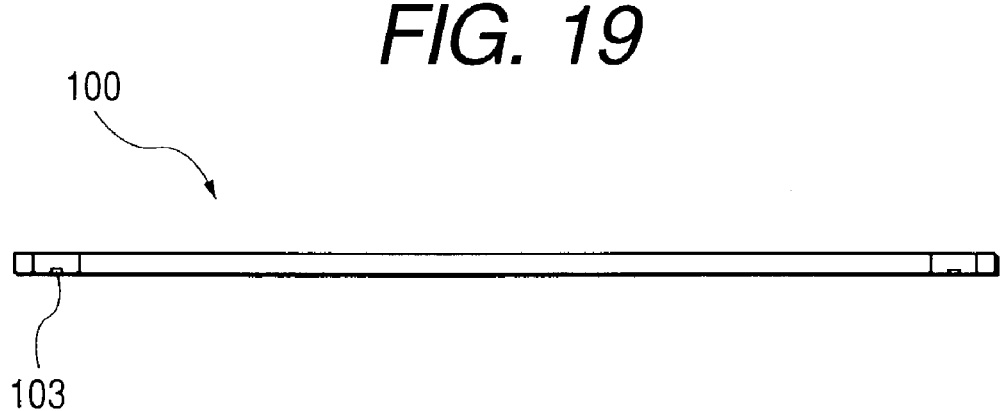
FIG. 19 is an axial sectional view of the separator plate according to the embodiment.

FIGS. 18 and 19 show the separator plate 100 in detail. FIG. 18 is a front view of the separator plate 100 and FIG. 19 is an axial sectional view of the separator plate. In FIG. 1, the separator plate 100 is disposed in adjacent to the snap ring 12. Further, each separator plate 100 is provided at its outer peripheral edge with a spline fitted into the inner periphery of the clutch case 110. The spline includes mountain portions 102a and valley portions 102b. Further, grooves 103 communicating between the outer periphery and the inner periphery and each having a predetermined inclination angle with respect to the radial direction are formed in a surface 102 which is not contracted with the friction plate 90. When the separator plate 100 is rotated in an anti-clockwise direction in FIG. 18, the lubricating oil flows from the inner diameter side to the outer diameter side.

Figure 20:
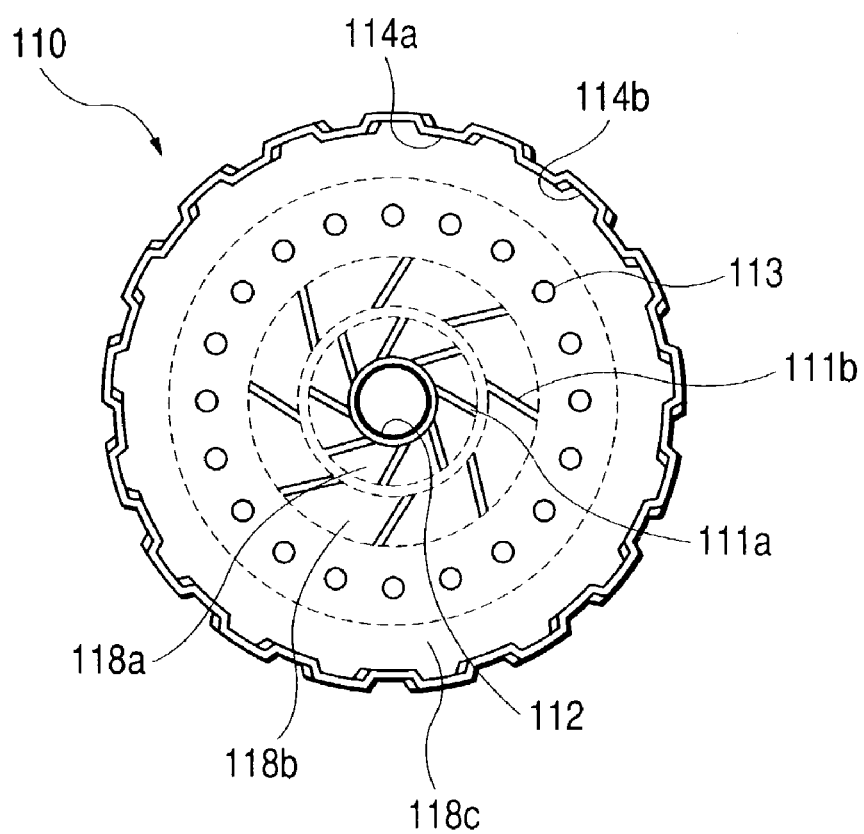
FIG. 20 is a front view of a clutch case according to an embodiment of the present invention.
Figure 21:
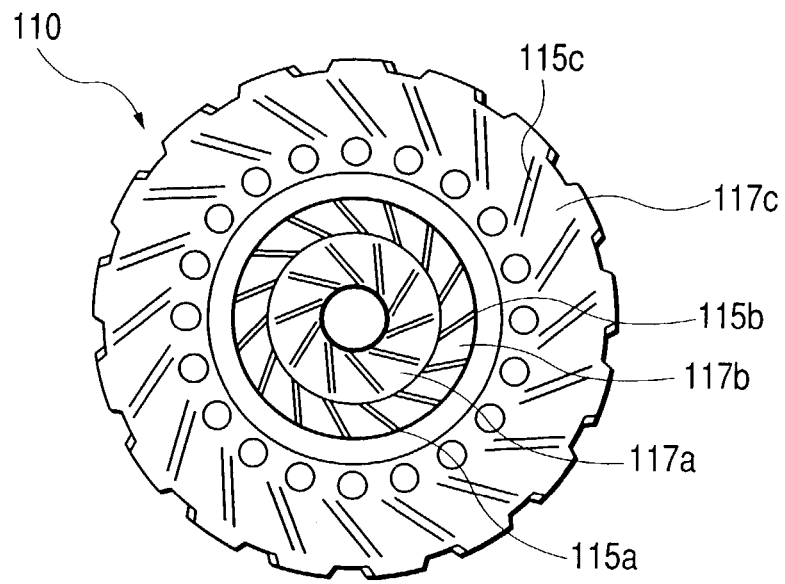
FIG. 21 is a rear view of the clutch case according to the embodiment.
Figure 22:
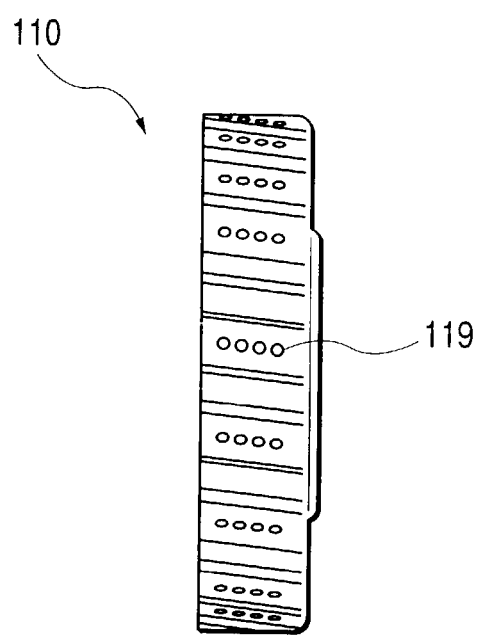
FIG. 22 is a side view of the clutch case according to the embodiment.

FIGS. 20 to 22 show the clutch case 110 in detail. FIG. 20 is a front view of the clutch case 110, FIG. 21 is a rear view of the clutch case and FIG. 22 is a side view of the clutch case. As shown in FIG. 20, the clutch case 110 has inner wall surfaces 118a, 118b, 118c extending radially, and grooves 111a and 111b each having a predetermined inclination angle with respect to the radial direction are formed in the inner walls 118a 118b, respectively, and projections 113 for supporting the loading spring 6 are formed on the inner wall 118c.

Further, mountain portions 114a and valley portions 114b of a spline to be fitted onto the separator plates 100 are formed an axially extending portion at the outer diameter side, and the spline also has a predetermined inclination angle with respect to the axial direction (refer to FIG. 22). On the other hand, as shown in FIG. 22, grooves 115a, 115b, 115c each having a predetermined inclination angle with respect to the radial direction are formed in outer wall surfaces 117a, 117b, 117c extending radially outside of the clutch case 110. Further, as shown in FIG. 22, there are provided a plurality of oil ports 119 passing through the clutch case 110 from the inner periphery to the outer periphery. Although not shown, each oil port 119 also has a predetermined inclination angle with respect to the radial direction so that, when the clutch case 110 is rotated in an anti-clockwise direction in FIG. 20, the lubricating oil flows form the inner peripheral side to the outer peripheral side.

Incidentally, the inclination angle is inclined to the right from the inner peripheral side to the outer peripheral side. With this arrangement, when the clutch case 110 is rotated in the anti-clockwise direction in FIG. 20, the lubricating oil is supplied more positively toward the outer peripheral side of the clutch case 110 by a centrifugal force and the pumping action of the grooves 111a, 111b and the oil ports 119 and then is routed to the rear side of the clutch case 110 by the pumping action of the spline having the inclination angle and then is sucked toward the inner peripheral side by the pumping action of the grooves 115a, 115b, 115c.

Figure 23:
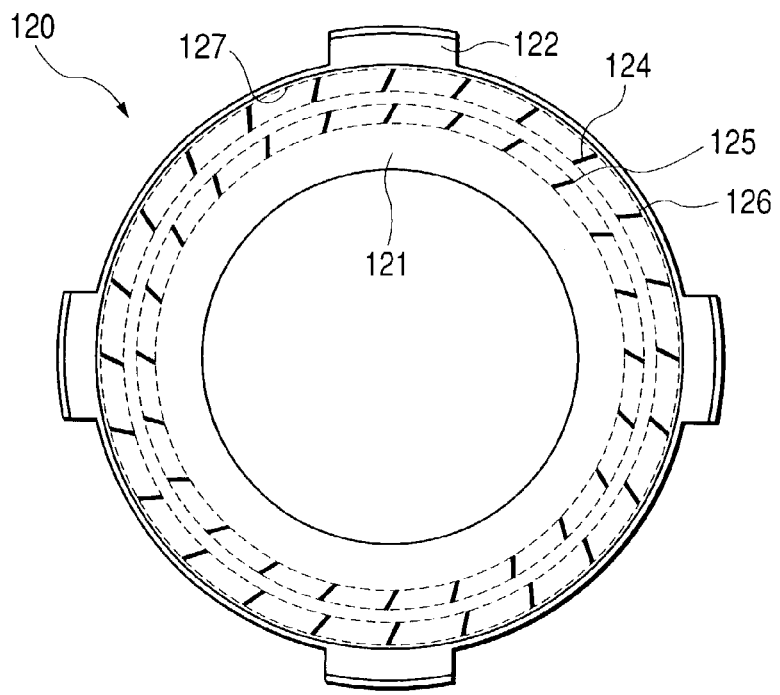
FIG. 23 is a front view of a pawl member according to an embodiment of the present invention.
Figure 24:
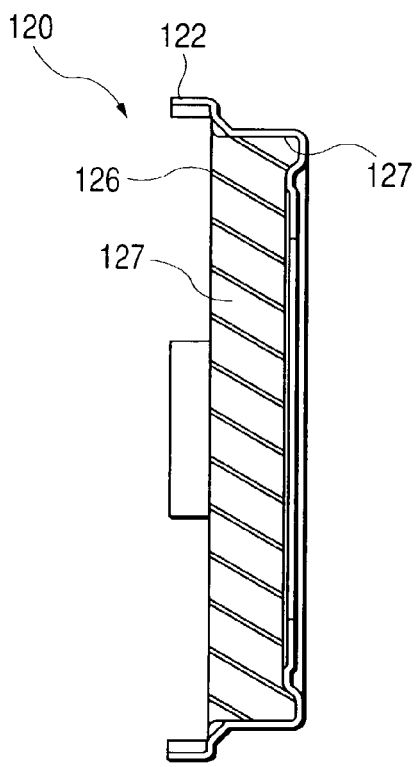
FIG. 24 is an axial sectional view of the pawl member according to the embodiment.
Figure 25:
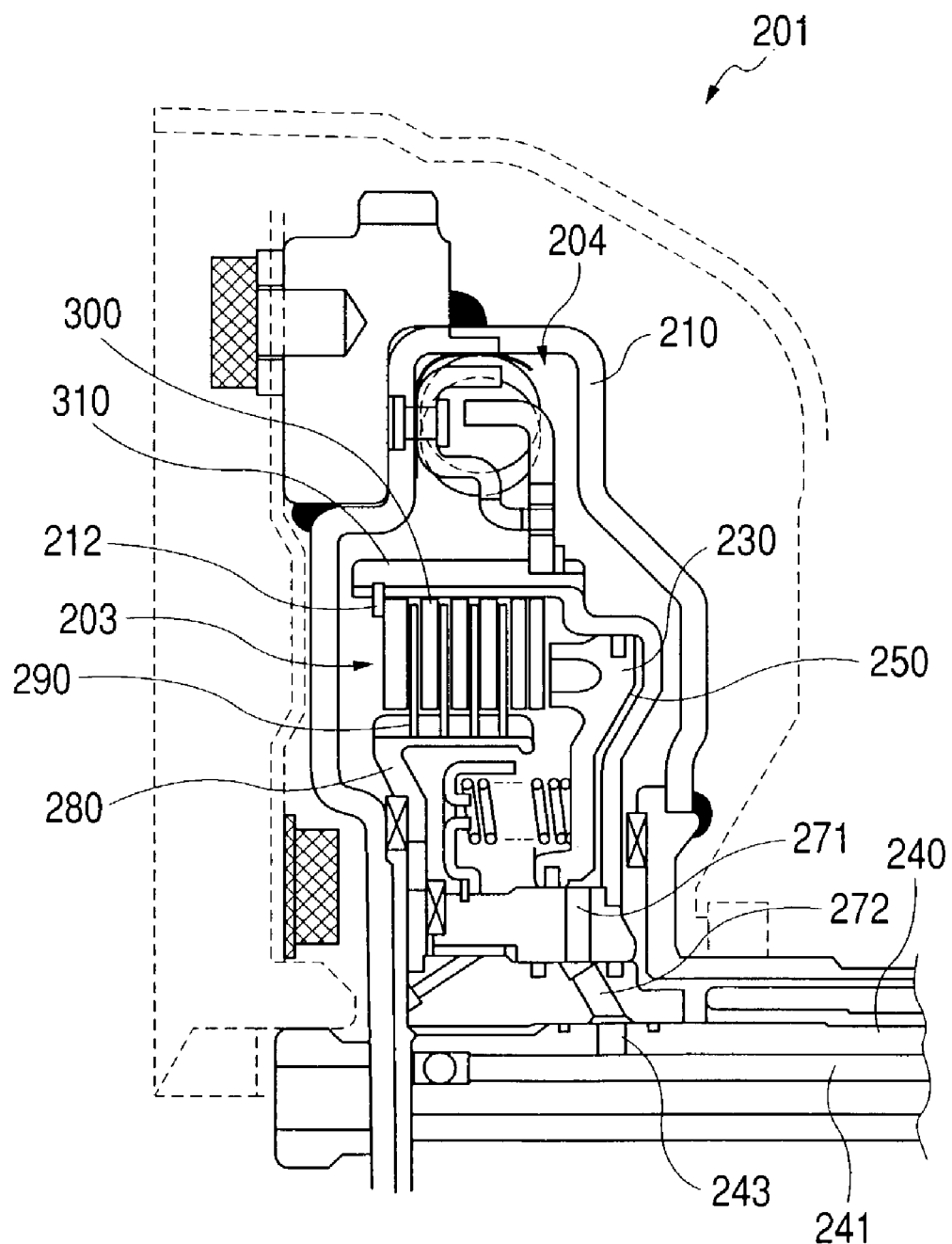
FIG. 25 is an axial sectional view of a conventional starting clutch.

FIGS. 23 and 24 show the pawl member 120 of the damper in detail. FIG. 23 is a front view of the pawl member 120 and FIG. 24 is an axial sectional view of the pawl member. As shown in FIG. 1, the pawl member 120 is provided at its outer periphery with a fitting portion 122 engaged by the damper spring 11. Further, grooves 124, 125 each having a predetermined inclination angle with respect to the radial direction are formed in a radially extending bottom surface 121. Further, grooves 126 each having a predetermined inclination angle with respect to the axial direction are formed in an inner peripheral surface 127. When the pawl member 120 is rotated in an anti-clockwise direction in FIG. 23, the lubricating oil is supplied toward the inner peripheral surface 127 by a centrifugal force and the pumping action of the grooves 124, 125 and is flown to the left in FIG. 24 by the pumping action of the grooves 126.

Although the present invention can be carried out in accordance with the above-mentioned embodiment, the present invention is not particularly limited to such an embodiment. For example, at least one of the vanes 22, 61 of the first vane wheel 20 and the second vane wheel 60, and at least one of the groves formed in various members may be used, but, all of the vanes and the grooves may not always be used. Further, the number and the inclination angles of the vanes 22, 61 and/or grooves of the members can be selected appropriately. Further, while the plural oil ports 84, 119 were illustrated in the drawings, single oil port may be used.

As mentioned above, according to the starting clutch of the present invention, the following effect can be achieved.

An electrical pump or an engine pump for effecting the operation of the starting clutch and the supplying of the lubricating oil can be eliminated, and a substitutive pump mechanism can be obtained with a simple construction to circulate the lubricating oil within the starting clutch.

What is claimed is:

1. A starting clutch in which lubricating oil supplied from a drive shaft side is circulated within said clutch and input side elements and output side elements are tightened by an axial load to transmit power, wherein:
   a non-electrically operated pump mechanism is provided within said starting clutch, said pump mechanism includes a plurality of pumping elements, each constituted by one of a groove or a port having a pumping function, and wherein each of a plurality of members selected from the group consisting of a drive shaft, a piston, a pawl member of a damper and a clutch case of said starting clutch is provided with at least one of said pumping elements.

2. A starting clutch according to claim 1, wherein each said pumping element is integrally formed in the respective member.

3. A starting clutch according to claim 1, wherein one of said pumping elements is constituted by a port provided on an outer periphery of said clutch case of said starting clutch.

4. A starting clutch according to claim 1, wherein at least one said pumping element is integrally formed in the respective member.

5. A starting clutch according to claim 1, further comprising a pumping element constituted by a groove provided on one of said input side element and said output side element.

6. A starting clutch according to claim 4, wherein said one pumping element is constituted by a port provided on an outer periphery of the clutch case.

* * * * *